US012662619B1

(12) United States Patent
    Onaizi

(10) Patent No.: US 12,662,619 B1
(45) Date of Patent: *Jun. 23, 2026

(54) METHOD OF SCAVENGING HYDROGEN SULFIDE FROM SOUR GAS WELL USING MINERAL OIL NANOEMULSIONS

(71) Applicant: KING FAHD UNIVERSITY OF PETROLEUM AND MINERALS, Dhahran (SA)

(72) Inventor: Sagheer A. Onaizi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/207,583

(22) Filed: May 14, 2025

(30) Foreign Application Priority Data

May 8, 2025    (SA) ................................. 1020253202

(51) Int. Cl.
    *C09K 8/54*        (2006.01)
    *B01D 53/14*        (2006.01)
    *E21B 43/16*        (2006.01)
(52) U.S. Cl.
    CPC ............ *C09K 8/54* (2013.01); *B01D 53/1468* (2013.01); *B01D 53/1493* (2013.01);
    (Continued)
(58) Field of Classification Search
    CPC .. C09K 2208/20; C09K 2208/32; C09K 8/52; C09K 8/532; C09K 8/54; C09K 8/528; E21B 41/02
    See application file for complete search history.

(56) References Cited

U.S. PATENT DOCUMENTS 11,479,706 B1    10/2022  Onaizi
11,708,517 B1 *  7/2023  Onaizi ..................... C09K 8/16
                                              166/304
(Continued)

FOREIGN PATENT DOCUMENTS

CN        103666711 A      3/2014
CN        105273702 A      1/2016
(Continued)

OTHER PUBLICATIONS

Translation of CN-111440601-A (Year: 2020).*
(Continued)

*Primary Examiner* — Angela M DiTrani Leff
(74) *Attorney, Agent, or Firm* — Oblon, McClelland, Maier & Neustadt, L.L.P.

(57)            ABSTRACT

A method of scavenging hydrogen sulfide from a sour gas well includes injecting a nanoemulsion through a borehole into a subterranean geological formation including a gaseous hydrocarbon composition including hydrogen sulfide. The nanoemulsion includes a mineral oil, water, a surfactant, and an additive. The water is a continuous phase of the nanoemulsion. The surfactant is selected from a group consisting of a sodium dodecylbenzenesulfonate, a cetyltrimethylammonium bromide, and a nonionic polyoxyethylene detergent. The additive is selected from a group consisting of a silver salt and a copper salt. The method includes circulating the nanoemulsion in the borehole in the subterranean geological formation to contact the nanoemulsion with the hydrocarbon composition and reacting the nanoemulsion with the hydrogen sulfide in the gaseous hydrocarbon composition to form a production gas including less than 5 parts per million (ppm) of hydrogen sulfide.

20 Claims, 7 Drawing Sheets

(52) U.S. Cl.
CPC ...... *E21B 43/168* (2013.01); *B01D 2252/103* (2013.01); *B01D 2252/504* (2013.01); *B01D 2252/60* (2013.01); *B01D 2257/304* (2013.01); *C09K 2208/20* (2013.01); *C09K 2208/32* (2013.01)

(56) References Cited

U.S. PATENT DOCUMENTS

| | | | | |
|---|---|---|---|---|
| 2006/0166835 A1* | 7/2006 | Yang | C09K 8/536 | 507/200 |
| 2012/0015852 A1* | 1/2012 | Quintero | C09K 8/528 | 507/119 |
| 2015/0000984 A1* | 1/2015 | McDaniel | E21B 21/06 | 175/64 |
| 2018/0362834 A1 | 12/2018 | Haghighi et al. | | |
| 2020/0339859 A1* | 10/2020 | Santos | E21B 21/065 | |

| | | | |
|---|---|---|---|
| 2022/0370983 A1 | 11/2022 | Al Wahedi et al. | |

FOREIGN PATENT DOCUMENTS

| | | | | | |
|---|---|---|---|---|---|
| CN | 111440601 A | * | 7/2020 | .............. | C09K 8/24 |
| TW | 201706393 A | * | 2/2017 | ............ | C09K 8/528 |

OTHER PUBLICATIONS

Translation of TW-201706393-A (Year: 2016).*
Chao Zhang, et al., "Development and application of modified lye for treating hydrogen sulphide in coal mine", Fuel, vol. 269, Feb. 27, 2020, 117233, 5 pages.
Diana Montes, et al., "Reactive H2S chemisorption on mesoporous silica molecular sieve-supported CuO or ZnO", Microporous and Mesoporous Materials, vol. 168, Oct. 4, 2021, pp. 111-120.

* cited by examiner

METHOD OF SCAVENGING HYDROGEN SULFIDE FROM SOUR GAS WELL USING MINERAL OIL NANOEMULSIONS

CROSS-REFERENCE TO RELATED APPLICATION

The present disclosure claims the benefit of Saudi Patent Application No. 1020253202, filed May 8, 2025, with the Saudi Authority for Intellectual Property Office, which is incorporated herein by reference in its entirety.

STATEMENT OF ACKNOWLEDGEMENT

Support provided by the Deanship of Research Oversight and Coordination, King Fahd University of Petroleum and Minerals, Saudi Arabia, through Project DF191027 is gratefully acknowledged.

BACKGROUND

Technical Field

The present disclosure is directed to a method of scavenging hydrogen sulfide from a sour gas well, and more particularly, to a method of scavenging hydrogen sulfide from a sour gas well using a nanoemulsion comprising a mineral oil, water, a surfactant, and an additive.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Enhanced oil recovery (EOR) is a technique in petroleum engineering aimed at increasing oil extraction from reservoirs. Various methods, including the use of nanoemulsions, have been explored to improve EOR efficiency. Nanoemulsions, which are stable dispersions of immiscible liquids, offer properties such as high surface area, good stability, and the ability to solubilize hydrophobic substances, making them useful for EOR applications. These dispersions improve oil recovery through mechanisms like reducing interfacial tension and altering wettability, facilitating better mobilization of trapped oil; however, EOR operations are complicated by the presence of hydrogen sulfide ($H_2S$), a toxic and corrosive gas, which can create health and operational hazards. Several methods have been developed to address $H_2S$, including chemical scavengers, yet challenges persist, particularly with conventional $H_2S$ scavengers that lack efficiency, stability, and/or environmental compatibility under certain reservoir conditions. $H_2S$ scavengers suffer from one or more drawbacks hindering their adoption.

Accordingly, an object of the present disclosure to provide a simple and efficient nanoemulsion comprising a mineral oil, water, a surfactant, and an additive for $H_2S$ scavenging from a sour gas well that may circumvent the drawbacks, such as complexity and high cost, of the materials and methods known in the art.

SUMMARY

In an exemplary embodiment, a method of scavenging hydrogen sulfide from a sour gas well is described. The method includes injecting a nanoemulsion through a borehole into a subterranean geological formation including a gaseous hydrocarbon composition including hydrogen sulfide. The nanoemulsion includes a mineral oil, water, a surfactant, and an additive. The water is a continuous phase of the nanoemulsion. The surfactant is selected from a group consisting of a sodium dodecylbenzenesulfonate, a cetyltrimethylammonium bromide, and a nonionic polyoxyethylene detergent. The additive is selected from a group consisting of a silver salt and a copper salt. The method includes circulating the nanoemulsion in the borehole in the subterranean geological formation to contact the nanoemulsion with the hydrocarbon composition and reacting the nanoemulsion with the hydrogen sulfide in the gaseous hydrocarbon composition to form a production gas including less than 5 parts per million (ppm) of hydrogen sulfide.

In some embodiments, a volumetric ratio of the mineral oil to the water in the nanoemulsion is from 1:3 to 1:5, and the nanoemulsion consists of the mineral oil, water, the surfactant, and the additive. In some embodiments, the nanoemulsion is circulated in the borehole while the borehole is sealed under static pressure. In some embodiments, the additive is present in the nanoemulsion in an amount of 0.1 to 1 percent by weight (wt. %) based on a total weight of the nanoemulsion and selected from the group consisting of the silver salt and the copper salt. In some embodiments, a mineral oil phase of the nanoemulsion has an average particle size of 20 to 200 nanometers (nm).

In some embodiments, the nanoemulsion includes the surfactant in an amount of 0.5 to 5 wt. % based on a total weight of the nanoemulsion.

In some embodiments, subterranean geological formation further includes a liquid hydrocarbon composition.

In some embodiments, the surfactant is the sodium dodecylbenzenesulfonate, the additive is the silver salt, and a breakthrough time of the hydrogen sulfide is 720 to 760 minutes.

In some embodiments, the surfactant is the nonionic polyoxyethylene detergent, the additive is the silver salt, and a breakthrough time of the hydrogen sulfide is 720 to 760 minutes.

In some embodiments, the surfactant is the cetyltrimethylammonium bromide, the additive is the copper salt, and a breakthrough time of the hydrogen sulfide is 1140 to 1180 minutes.

In some embodiments, the surfactant is the nonionic polyoxyethylene detergent, the additive is the copper salt, and the breakthrough time of the hydrogen sulfide is 1110 to 1160 minutes.

In some embodiments, the surfactant is the sodium dodecylbenzenesulfonate, the additive is the copper salt, and the breakthrough time of the hydrogen sulfide is 1070 to 1110 minutes.

In some embodiments, the surfactant is the sodium dodecylbenzenesulfonate, the additive is the silver salt, and a zeta potential of the nanoemulsion is −84 to −74 mV.

In some embodiments, the surfactant is the cetyltrimethylammonium bromide, the additive is the copper salt, and a zeta potential of the nanoemulsion is 67 to 77 mV.

In some embodiments, the surfactant is the sodium dodecylbenzenesulfonate, the additive is the copper salt, and a zeta potential of the nanoemulsion is −80 to −70 mV.

In some embodiments, the method further includes aging the nanoemulsion for 25 to 35 days before the injecting.

In some embodiments, the surfactant is the sodium dodecylbenzenesulfonate, the additive is the silver salt, and a breakthrough time of the hydrogen sulfide is 710 to 750 minutes.

In some embodiments, the surfactant is the sodium dodecylbenzenesulfonate, the additive is the silver salt, and a zeta potential of the nanoemulsion is −75 to −67 mV.

In some embodiments, the surfactant is the nonionic polyoxyethylene detergent, the additive is the silver salt, and a breakthrough time of the hydrogen sulfide is 480 to 510 minutes.

In some embodiments, the surfactant is the cetyltrimethylammonium bromide, the additive is the copper salt, and a breakthrough time of the hydrogen sulfide is 1100 to 1130 minutes.

In some embodiments, the surfactant is the cetyltrimethylammonium bromide, the additive is the copper salt, and a zeta potential of the nanoemulsion is 60 to 70 mV.

In some embodiments, the surfactant is the nonionic polyoxyethylene detergent, the additive is the copper salt, and the breakthrough time of the hydrogen sulfide is 1090 to 1130 minutes.

In some embodiments, the surfactant is the sodium dodecylbenzenesulfonate, the additive is the copper salt, and the breakthrough time of the hydrogen sulfide is 1060 to 1100 minutes.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
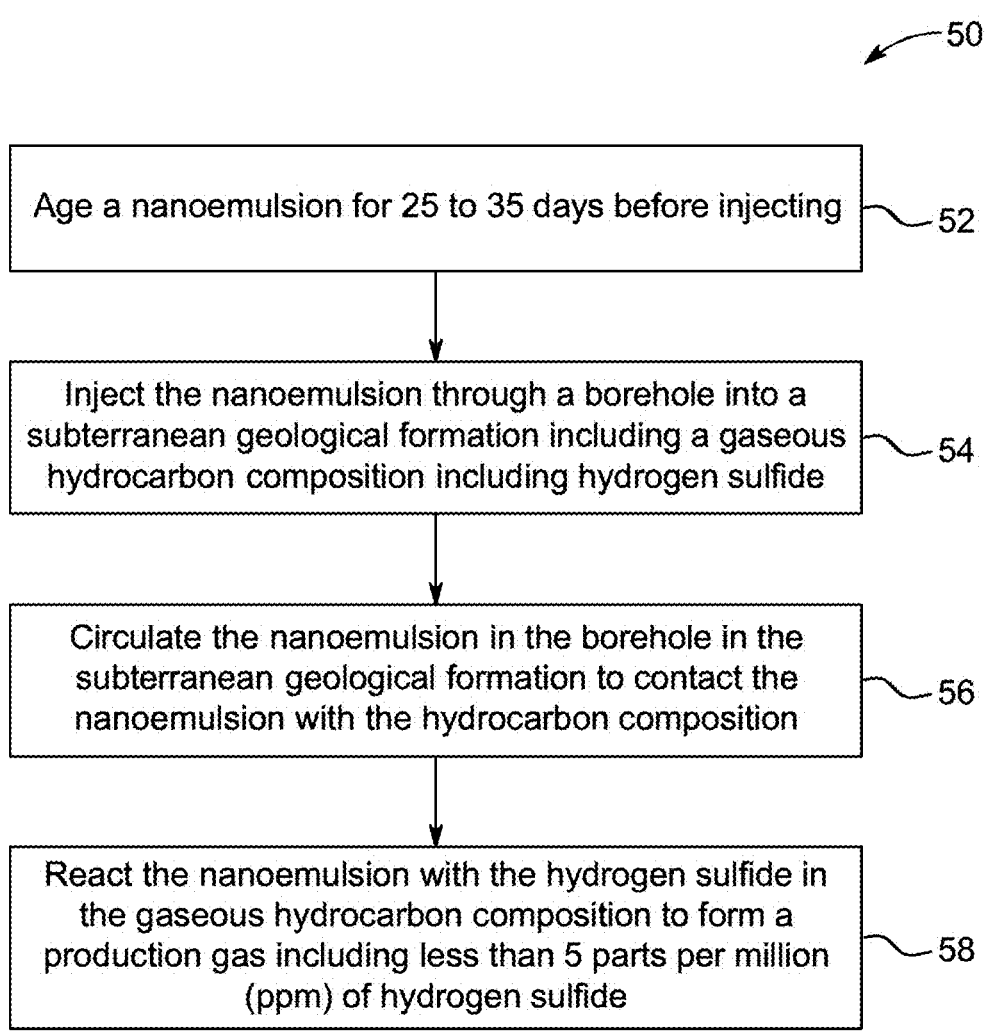
FIG. 1 is a flow chart of a method of scavenging hydrogen sulfide from a sour gas well, according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals will be used to designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

The present disclosure is intended to include all hydration states of a given compound or formula, unless otherwise noted or when heating a material.

As used herein, the term "surfactant" refers to an organic chemical that, when added to a liquid, changes the properties of that liquid at a surface. The surfactant may serve as a water-wetting agent, a defoamer, a foamer, a detergent, a dispersant, and/or an emulsifier.

A surfactant molecule includes one or more hydrophilic head units attached to one or more hydrophobic tails. The tail of most surfactants includes a hydrocarbon chain, which can be branched, linear, or aromatic. Fluorosurfactants have fluorocarbon chains. Siloxane surfactants have siloxane chains. Gemini surfactant molecules include two or more hydrophilic heads and two or more hydrophobic tails. Many surfactants include a polyether chain terminating in a highly polar anionic group. The polyether groups often include ethoxylated (polyethylene oxide-like) sequences inserted to increase the hydrophilic character of a surfactant. Alternatively, polypropylene oxides may be inserted to increase the lipophilic character of a surfactant.

Cationic surfactants have cationic (positive charge) functional groups at their head, such as primary and secondary amines. Cationic surfactants include, but are not limited to, octenidine dihydrochloride, cetrimonium bromide (CTAB), cetylpyridinium chloride (CPC), benzalkonium chloride (BAC), benzethonium chloride (BZT), dimethyldioctadecylammonium chloride, dioctadecyldimethylammonium bromide (DODAB), and the like. A cationic surfactant may be replaced by a nonionic surfactant, an anionic surfactant, a cationic surfactant, a viscoelastic surfactant, and/or a zwitterionic surfactant.

Anionic surfactants contain anionic (negative charge) functional groups at their head, such as sulfate, sulfonate, phosphate, carboxylate, and the like. The anionic surfactant may be, but is not limited to, an alkyl sulfate, an alkyl ether sulfate, an alkyl ester sulfonate, an alpha olefin sulfonate, a linear alkyl benzene sulfonate, a branched alkyl benzene sulfonate, a linear dodecylbenzene sulfonate, a branched dodecylbenzene sulfonate, an alkyl benzene sulfonic acid, a dodecylbenzene sulfonic acid, a sulfosuccinate, a sulfated alcohol, a ethoxylated sulfated alcohol, an alcohol sulfonate, an ethoxylated and propoxylated alcohol sulfonate, an alcohol ether sulfate, an ethoxylated alcohol ether sulfate, a propoxylated alcohol sulfonate, a sulfated nonyl phenol, an ethoxylated and propoxylated sulfated nonyl phenol, a sulfated octyl phenol, an ethoxylated and propoxylated sulfated octyl phenol, a sulfated dodecyl phenol, an ethoxylated and propoxylated sulfated dodecyl phenol, and the like. Other anionic surfactants include, but are not limited to, ammonium lauryl sulfate, sodium lauryl sulfate (sodium dodecyl sulfate, SLS, or SDS), and related alkyl-ether sulfates sodium laureth sulfate (sodium lauryl ether sulfate or SLES), sodium myreth sulfate, docusate (dioctyl sodium sulfosuccinate), perfluorooctanesulfonate (PFOS), perfluorobutanesulfonate, alkyl-aryl ether phosphates, alkyl ether phosphates, a combination thereof, and the like.

Zwitterionic (amphoteric) surfactants have both cationic and anionic groups attached to the same molecule. Zwitterionic surfactants include, but are not limited to, CHAPS (3-[(3-cholamidopropyl)dimethylammonio]-1-propanesulfonate), cocamidopropyl hydroxysultaine, ocamidopropyl betaine, phospholipids, sphingomyelins, and the like.

Nonionic surfactants have a polar group that does not have a charge. These include long chain alcohols that exhibit surfactant properties, such as cetyl alcohol, stearyl alcohol, cetostearyl alcohol, oleyl alcohol, other fatty alcohols, and the like. Other long chain alcohols with surfactant properties include, but are not limited to, polyethylene glycols of various molecular weights, polyethylene glycol alkyl ethers having the formula $CH_3(CH_2)_{10-16}(OC_2H_4)_{1-25}OH$, such as octaethylene glycol monododecyl ether and pentaethylene glycol monododecyl ether; polypropylene glycol alkyl ethers having the formula $CH_3(CH_2)_{10-16}(OC_3H_6)_{1-25}OH$; glucoside alkyl ethers having the formula $CH_3(CH_2)_{10-16}(O$-glucoside$)_{1-3}OH$, such as decyl glucoside, lauryl glucoside, octyl glucoside; polyethylene glycol octylphenyl ethers having the formula $C_8H_{17}(C_6H_4)(OC_2H_4)_{1-25}$-OH, such as Triton X-100; polyethylene glycol alkylphenyl ethers having the formula $C_9H_{19}(C_6H_4)(OC_2H_4)_{1-25}$-OH, such as nonoxynol-9; glycerol alkyl esters such as glyceryl laurate; polyoxyethylene glycol sorbitan alkyl esters such as polysorbate, sorbitan alkyl esters, cocamide MEA, cocamide DEA, dodecyldimethylamine oxide, block copolymers of polyethylene glycol and polypropylene glycol, such as poloxamers, and polyethoxylated tallow amine (POEA).

A dendritic surfactant molecule may include at least two lipophilic chains that have been joined at a hydrophilic center and have a branch-like appearance. In each dendritic surfactant, there may be from about 2 lipophilic moieties independently to about 4 lipophilic moieties attached to each hydrophilic group, or up to about 8 lipophilic moieties attached to the hydrophilic group, for example. "Independently," as used herein, with respect to ranges means that any lower threshold may be combined with any upper threshold. The dendritic surfactant may have a better repulsion effect as a stabilizer at an interface and/or a better interaction with a polar oil, as compared with other surfactants. Dendritic surfactant molecules are sometimes called "hyperbranched" molecules.

A dendritic extended surfactant is a dendritic surfactant having a non-ionic spacer arm between the hydrophilic group and a lipophilic tail. For example, the non-ionic spacer-arm extension may be the result of polypropoxylation, polyethoxylation, or a combination of the two with the polypropylene oxide next to the tail and polyethylene oxide next to the head. The spacer arm of a dendritic extended surfactant may contain from about 1 independently to about 20 propoxy moieties and/or from about 0 independently to about 20 ethoxy moieties. Alternatively, the spacer arm may contain from about 2 independently up to about 16 propoxy moieties and/or from about 2 independently up to about 8 ethoxy moieties. Spacer arm extensions may also be formed from other moieties including, but not limited to, glyceryl, butoxy, glucoside, isosorbide, xylitols, a combination thereof, and the like. For example, the spacer arm of a dendritic extended surfactant may contain both propoxy and ethoxy moieties. The polypropoxy portion of the spacer arm may be considered lipophilic; however, the spacer arm may also contain a hydrophilic portion to attach the hydrophilic group. The hydrophilic group may generally be a polyethoxy portion having about two or more ethoxy groups. These portions are generally in blocks, rather than being randomly mixed. Further, the spacer arm extension may be a polypropylene oxide chain.

Another type of surfactant is a viscoelastic surfactant (VES). Conventional surfactant molecules are characterized by having one long hydrocarbon chain per surfactant headgroup. In a viscoelastic gelled state these molecules aggregate into worm-like micelles. A viscoelastic gel is a gel that has elastic properties, meaning that the gel at least partially returns to its original form when an applied stress is removed. Typical viscoelastic surfactants include, but are not limited to, N-erucyl-N,N-bis(2-hydroxyethyl)-N-methyl ammonium chloride potassium oleate, and the like, solutions of which form gels when mixed with inorganic salts such as potassium chloride and/or with organic salts such as sodium salicylate.

As used herein, the term "sour gas well" refers to an oil or natural gas well that produces sour gas, which is gas containing hydrogen sulfide. Hydrogen sulfide is a toxic, corrosive, and flammable gas with a distinct odor of rotten eggs. Sour gas wells are typically found in regions where natural gas or oil reserves contain large amounts of hydrogen sulfide, which can present safety, environmental, and corrosion challenges. These wells require specialized equipment and processing techniques to safely extract, transport, and treat the gas.

As used herein, the term "scavenging hydrogen sulfide" refers to the process of removing or neutralizing hydrogen sulfide from a gas or liquid stream. This is typically done using a hydrogen sulfide scavenger, which is a chemical compound or material that reacts with hydrogen sulfide to convert it into a less harmful substance. The process is used in industries such as oil and gas production, natural gas processing, and petrochemical operations, where the presence of hydrogen sulfide can be toxic, corrosive, and hazardous to equipment and workers. Scavenging helps to reduce the concentration of hydrogen sulfide, ensuring safety, preventing corrosion, and minimizing environmental impact.

As used herein, the term "nanoemulsion" is a type of emulsion with small droplet sizes, typically ranging from 20 to 200 nanometers. A nanoemulsion is a heterogeneous formulation of two different immiscible liquids (typically water and oil), and a surfactant or stabilizer, where oil droplets are dispersed in a water phase (or vice versa). Due to their small size, nanoemulsions have enhanced stability and bioavailability.

As used herein, the term "additive" refers to a substance, compound, or material added to a product or material to enhance or modify its properties, performance, or functionality. They are usually included in small amounts and serve specific purposes without altering the main product.

As used herein, the term "hydrocarbon" refers to an organic compound composed only of carbon and hydrogen atoms. They are found in fossil fuels like oil and natural gas and are categorized into alkanes (saturated), alkenes (unsaturated with double bonds), alkynes (unsaturated with triple bonds), and aromatics (ring structures).

Aspects of the present disclosure are directed toward a method of scavenging hydrogen sulfide from a sour gas well using a nanoemulsion. The nanoemulsion includes mineral oil as a dispersed phase, water as a continuous phase, a surfactant as an emulsifier, and a salt included as an $H_2S$ scavenger (i.e., an additive). The nanoemulsion is introduced into a bubble column, where sour gas, including $H_2S$ and methane, is bubbled through the nanoemulsion. The concentration of $H_2S$ in the exit gas stream is continuously monitored, allowing for the determination of the amount of $H_2S$ scavenged. The method of the present disclosure shows that the nanoemulsion exhibits selective $H_2S$ scavenging properties, with the efficacy of the nanoemulsion formulation is independent of the presence of hydrocarbons in the gas feed.

FIG. 1 illustrates a flow chart of a method 50 of scavenging hydrogen sulfide from a sour gas well. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes injecting a nanoemulsion through a borehole into a subterranean geological formation including a gaseous hydrocarbon composition including hydrogen sulfide. In some embodiments, the borehole may be a wellbore. In one or more embodiments, the wellbore may be present in an oil well, a gas well, a production well, an injection well, a naturally flowing well, an artificially lifted well, a high-temperature well, a steam-assisted gravity drainage well, a steam injector well, a geothermal well, a combination thereof, and the like. The wellbore may be formed in the subterranean geologic formation by known techniques. The subterranean geological formation may include, but is not limited to, a depleted oil reservoir, a depleted gas reservoir, a sour reservoir, a hydrocarbon-bearing subterranean formation, a saline formation, an un-minable coal bed, a combination thereof, and the like.

The nanoemulsion is injected through the borehole into the subterranean geological formation. The subterranean geological formation includes a gaseous hydrocarbon composition including hydrogen sulfide. In some embodiments, the subterranean geological formation further includes a liquid hydrocarbon composition.

The nanoemulsion includes a mineral oil, water, a surfactant, and an additive. The water is a continuous phase of the nanoemulsion. In some embodiments, the mineral oil may include, but is not limited to, paraffin oil, liquid paraffin, white oil, light mineral oil, heavy mineral oil, USP mineral oil, mineral spirits, refined mineral oil, petrolatum, medicinal mineral oil, a combination thereof, and the like. In some embodiments, the water may be tap water, distilled water, bi-distilled water, deionized water, deionized distilled water, reverse osmosis water, hard water, fresh water, brine/salt water, a combination thereof, and the like. In some embodiments, the hard water and the brine/salt water may include salts of sodium, magnesium, calcium, potassium, ammonium, iron, a combination thereof, and the like, and anions such as chloride, bicarbonate, carbonate, sulfate, sulfite, phosphate, iodide, nitrate, acetate, citrate, fluoride, nitrite, a combination thereof, and the like.

The surfactant is selected from a group consisting of a sodium dodecylbenzenesulfonate, a cetyltrimethylammonium bromide, and a nonionic polyoxyethylene detergent. In some embodiments, the surfactant may include, but is not limited to, sodium dodecylbenzenesulfonate, cetyltrimethylammonium bromide, sodium lauryl sulfate, polyoxyethylene (20) sorbitan monooleate (tween 80), cetrimonium bromide, polysorbate 20, polysorbate 80, sodium laureth sulfate, sodium cocoyl glutamate, disodium laureth sulfosuccinate, cocamidopropyl betaine, lauryl glucoside, sodium oleate, decyl glucoside, cocamidopropylamine oxide, polyquaternium-7, sodium myreth sulfate, laurylamine oxide, dimethicone copolyol, stearyl alcohol, a combination thereof, and the like. In some embodiments, the nanoemulsion includes the surfactant in an amount of 0.5 to 5 percent by weight (wt. %), preferably 1 to 4 wt. %, more preferably 1.5 to 3 wt. %, and yet more preferably about 2 wt. % based on a total weight of the nanoemulsion.

The additive is selected from a group consisting of a silver salt and a copper salt. In some embodiments, the silver salt may include, but is not limited to, silver nitrate, silver acetate, silver carbonate, silver bromide, silver sulfide, silver chloride, silver iodide, silver thiocyanate, silver phosphate, silver sulfate, their hydrates, a combination thereof, and the like. In a preferred embodiment, the silver salt is silver nitrate. In another preferred embodiment, the silver salt is silver nitrate trihydrate. In some embodiments, the copper salt may include, but is not limited to, copper sulfate, copper chloride, copper acetate, copper hydroxide, copper nitrate, copper pyrite, copper formate, copper benzoate, copper citrate, copper carbonate, their hydrates, a combination thereof, and the like. In a preferred embodiment, the copper salt is copper nitrate. In another preferred embodiment, the copper salt is copper nitrate trihydrate.

In some embodiments, a volumetric ratio of the mineral oil to the water in the nanoemulsion is from 1:3 to 1:5, preferably 1:3.5 to 1:4.5, and more preferably about 1:4. In some embodiments, the nanoemulsion consists of the mineral oil, water, the surfactant, and the additive. In some embodiments, the additive is present in the nanoemulsion in an amount of 0.1 to 1 percent by weight (wt. %), preferably 0.2 to 0.9 wt. %, preferably 0.3 to 0.8 wt. %, preferably 0.4 to 0.7 wt. %, and preferably 0.3 to 0.4 wt. % based on a total weight of the nanoemulsion and selected from the group consisting of the silver salt and the copper salt. In some embodiments, a mineral oil phase of the nanoemulsion has an average particle size of 20 to 200 nm, preferably 30 to 190 nm, preferably 40 to 180 nm, preferably 50 to 170 nm, preferably 60 to 160 nm, preferably 70 to 150 nm, preferably 80 to 140 nm, preferably 90 to 130 nm, and preferably 100 to 120 nm.

In some embodiments, the nanoemulsion may include, but is not limited to, weighting agents, emulsifiers, viscosities, fluid-loss control agents, bridging agents, pH controlling agents, defoamers, clay stabilizers, anti-scalants, deflocculants, lubricants, gelling agents, corrosion inhibitors, rheology control modifiers or thinners, high temperature/high pressure control additives, acids, alkalinity agents, pH buffers, fluorides, gases, nitrogen, carbon dioxide, surface modifying agents, tackifying agents, foamers, catalysts, clay control agents, biocides, bactericides, friction reducers, antifoam agents, dispersants, flocculants, $H_2S$ scavengers, $CO_2$ scavengers, oxygen scavengers, friction reducers, breakers, relative permeability modifiers, resins, particulate materials (e.g., proppant particulates), wetting agents, coating enhancement agents, filter cake removal agents, odorants, shale stabilizers, a combination thereof, and the like.

In some embodiments, the method further includes aging a nanoemulsion for 25 to 35 days, preferably 28 to 32 days, more preferably 29 to 31 days, and yet more preferably about 30 days before injecting. As used herein, the term "aging a nanoemulsion" refers to a process of allowing the nanoemulsion to remain in a controlled environment under specific temperature and pressure conditions. During this time, the nanoemulsion may undergo physical and chemical changes that may help improve its stability, particle size distribution, and/or overall performance. Aging can lead to a better dispersion of active ingredients, enhanced emulsion stability, reduced aggregation of nanoparticles, and improved interactions between the emulsion components. In some embodiments, the nanoemulsion may be mixed during the aging.

At step 54, the method 50 includes circulating the nanoemulsion in the borehole in the subterranean geological formation to contact the nanoemulsion with the hydrocarbon composition. In some embodiments, the nanoemulsion is circulated in the borehole while the borehole is sealed under static pressure. In some embodiments, the nanoemulsion may be circulated in the borehole through methods, such as pumping, where high-pressure pumps inject the nanoemulsion into the wellbore, forcing it down the wellbore, and circulating it back to the surface. In some embodiments, reverse circulation may be employed, where the nanoemulsion is pumped in the opposite direction to improve contact with the subterranean geological formation. In some embodiments, continuous flow may be used to circulate the nanoemulsion, where the nanoemulsion is continuously injected during the drilling process, ensuring constant circulation and interaction with the hydrocarbon composition. Additionally, injection via coiled tubing allows for precise placement and circulation of the nanoemulsion into specific sections of the borehole. Each method ensures the nanoemulsion remains in contact with the subterranean geological formation while maintaining a pressure. Circulating the nanoemulsion in the borehole in the subterranean geological formation enhances the effectiveness of the nanoemulsion in interacting with target compounds in the subterranean geological formation.

At step 56, the method 50 includes reacting the nanoemulsion with the hydrogen sulfide in the gaseous hydrocarbon composition to form a production gas including less than 5 parts per million (ppm), preferably less than 4.5 ppm, preferably less than 4 ppm, preferably less than 3.5 ppm, preferably less than 3 ppm, preferably less than 2.5 ppm, preferably less than 2 ppm, preferably less than 1.5 ppm, preferably less than 1 ppm, and preferably less than 0.5 ppm of hydrogen sulfide. In some embodiments, the concentration of the nanoemulsion may be adjusted according to the amount of hydrogen sulfide.

In an embodiment, the surfactant is the sodium dodecylbenzenesulfonate, the additive is the silver salt, and a breakthrough time of the hydrogen sulfide is 720 to 760 minutes, preferably 725 to 755 minutes, preferably 730 to 750 minutes, more preferably 735 to 745 minutes, and yet more preferably about 742 minutes. In some embodiments, the nanoemulsion is aged for about 30 days, the surfactant is the sodium dodecylbenzenesulfonate, the additive is the silver salt, and a breakthrough time of the hydrogen sulfide is 710 to 750 minutes, preferably 715 to 745 minutes, preferably 720 to 740 minutes, more preferably 725 to 735 minutes, and yet more preferably about 733 minutes.

In some embodiments, the surfactant is the sodium dodecylbenzenesulfonate, the additive is the copper salt, and a breakthrough time of the hydrogen sulfide in 1070 to 1110 minutes, preferably 1075 to 1105 minutes, preferably 1080 to 1100 minutes, more preferably 1085 to 1095 minutes, and yet more preferably about 1090 minutes.

In an embodiment, the surfactant is the sodium dodecylbenzenesulfonate, the additive is the silver salt, and a zeta potential of the nanoemulsion is −84 to −74 mV, preferably −83 to −75 mV, preferably −82 to −76 mV, preferably −81 to −77 mV, preferably −80 to −78 mV, more preferably −79 to −78.5 mV, and yet more preferably about −78.9 mV. In some embodiments, the nanoemulsion is aged for about 30 days, the surfactant is the sodium dodecylbenzenesulfonate, the additive is the silver salt, and a zeta potential of the nanoemulsion is −75 to −67 mV, preferably −74 to −68 mV, preferably −73 to −69 mV, more preferably −72 to −70 mV, and yet more preferably about −71.8 mV.

In some embodiments, the surfactant is the sodium dodecylbenzenesulfonate, the additive is the copper salt, and a zeta potential of the nanoemulsion is −80 to −70 mV, preferably −79 to −72 mV, preferably −78 to −74 mV, more preferably −77 to −75 mV, and yet more preferably about −76.4 mV.

In some embodiments, the surfactant is the nonionic polyoxyethylene detergent, the additive is the silver salt, and a breakthrough time of the hydrogen sulfide is 720 to 760 minutes, preferably 725 to 755 minutes, preferably 730 to 750 minutes, more preferably 735 to 745 minutes, and yet more preferably about 741 minutes. In some embodiments, the nanoemulsion is aged for about 30 days, the surfactant is the nonionic polyoxyethylene detergent, the additive is the silver salt, and a breakthrough time of the hydrogen sulfide is 480 to 510 minutes, preferably 485 to 505 minutes, more preferably 490 to 500 minutes, and yet more preferably about 493 minutes.

In some embodiments, the surfactant is the nonionic polyoxyethylene detergent, the additive is the copper salt, and a breakthrough time of the hydrogen sulfide in 1110 to 1160 minutes, preferably 1115 to 1155 minutes, preferably 1120 to 1150 minutes, preferably 1125 to 1145 minutes, more preferably 1130 to 1140 minutes, and yet more preferably about 1135 minutes. In some embodiments, the nanoemulsion is aged for about 30 days, the surfactant is the nonionic polyoxyethylene detergent, the additive is the copper salt, and a breakthrough time of the hydrogen sulfide in 1090 to 1130 minutes, preferably 1095 to 1125 minutes, preferably 1100 to 1120 minutes, more preferably 1105 to 1115 minutes, and yet more preferably about 1110 minutes.

In some embodiments, the surfactant is the cetyltrimethylammonium bromide, the additive is the copper salt, and a breakthrough time of the hydrogen sulfide in 1140 to 1180 minutes, preferably 1145 to 1175 minutes, preferably 1150 to 1170 minutes, more preferably 1155 to 1165 minutes, and yet more preferably about 1161 minutes. In some embodiments, the nanoemulsion is aged for about 30 days, the surfactant is the cetyltrimethylammonium bromide, the additive is the copper salt, and a breakthrough time of the hydrogen sulfide in 1100 to 1130 minutes, preferably 1105 to 1125 minutes, more preferably 1110 to 1120 minutes, and yet more preferably about 1115 minutes.

In some embodiments, the surfactant is the cetyltrimethylammonium bromide, the additive is the copper salt, the nanoemulsion has a zeta potential of 67 to 77 mV, preferably 68 to 76 mV, preferably 69 to 75 mV, preferably 70 to 74 mV, more preferably 71 to 73 mV, and yet more preferably about 72.1 mV. In some embodiments, the nanoemulsion is aged for about 30 days, the surfactant is the cetyltrimethylammonium bromide, the additive is the copper salt, the nanoemulsion has a zeta potential of 60 to 70 mV, preferably 61 to 69 mV, preferably 62 to 68 mV, preferably 63 to 67 mV, more preferably 64 to 66 mV, and yet more preferably about 64.7 mV.

The following examples are provided solely for illustration and are not to be construed as limitations of the present disclosure, as many variations thereof are possible without departing from the spirit and scope of the present disclosure.

EXAMPLES

The following examples describe and demonstrate a method of scavenging hydrogen sulfide from a sour gas well. The examples are provided solely for illustration and are not to be construed as limitations of the present disclosure, as many variations thereof are possible without departing from the spirit and scope of the present disclosure.

Example 1: Nanoemulsion Formulation

Preparation of nanoemulsions was performed in two steps. In the first step, coarse emulsions were prepared by mixing mineral oil with an aqueous solution of the emulsifier (also referred to as the surfactant), nonionic polyoxyethylene detergent, sodium dodecylbenzenesulfonate, and cetyltrimethylammonium bromide. The mineral oil:water volumetric ratio was fixed at 1:4, and the level of the emulsifier (for example, nonionic polyoxyethylene detergent) was fixed 2 wt. %. After mixing the emulsion ingredients, the coarse emulsions were stirred overnight at room temperature. In the second step of the nanoemulsion preparation, the coarse emulsions were sonicated (using a probe sonicator) for 15 minutes with a pulse of 30 seconds on followed by 3 seconds off. To avoid overheating of the emulsions during the sonication process, flasks containing the emulsions were immersed in a cold-water bath, with a frequent replenishment of cold water. Immediately after completion of the sonication process, 10 mL of each formulated nanoemulsion was transferred into a graduated cylinder, which was then tightly closed, and the nanoemulsion stability was evaluated by measuring the volume of the separated (if any) oil or/and water for 30 days.

Example 2: Additive-Containing Nanoemulsion Formulation

Preparation of the additive-containing (i.e., a silver salt and a copper salt) nanoemulsions is similar to those of additive-free nanoemulsions, except that the aqueous phase in the case of additive-containing contained a certain amount of, for example, silver nitrate or copper nitrate (including hydrate forms), corresponding to 0.3 wt. % in the final nanoemulsion. The remaining steps are similar to those detailed in Example 1.

Example 3: Identifying Nanoemulsion Type

Nanoemulsion type was determined using the solubility test where about 1 mL of each nanoemulsion was taken and placed in either mineral oil or water. The nanoemulsion portion placed in mineral oil settled down and remained intact while the one placed in water readily mixed and disappeared, indicating that the nanoemulsions are oil-in-water.

Example 4: Nanoemulsion Stability

Stability of the nanoemulsions was assessed by placing 10 mL of freshly prepared nanoemulsion in a 10-mL graduated cylinder. The cylinder was tightly closed and stored at room temperature for one month (30 days). During the nanoemulsion storage, any separated oil or water volume was recorded as a function of time. The demulsification rate was calculated by dividing the separated mineral oil or water volume (if any) over the original mineral oil or water volume used to prepare a nanoemulsion.

Figures 2, 3:
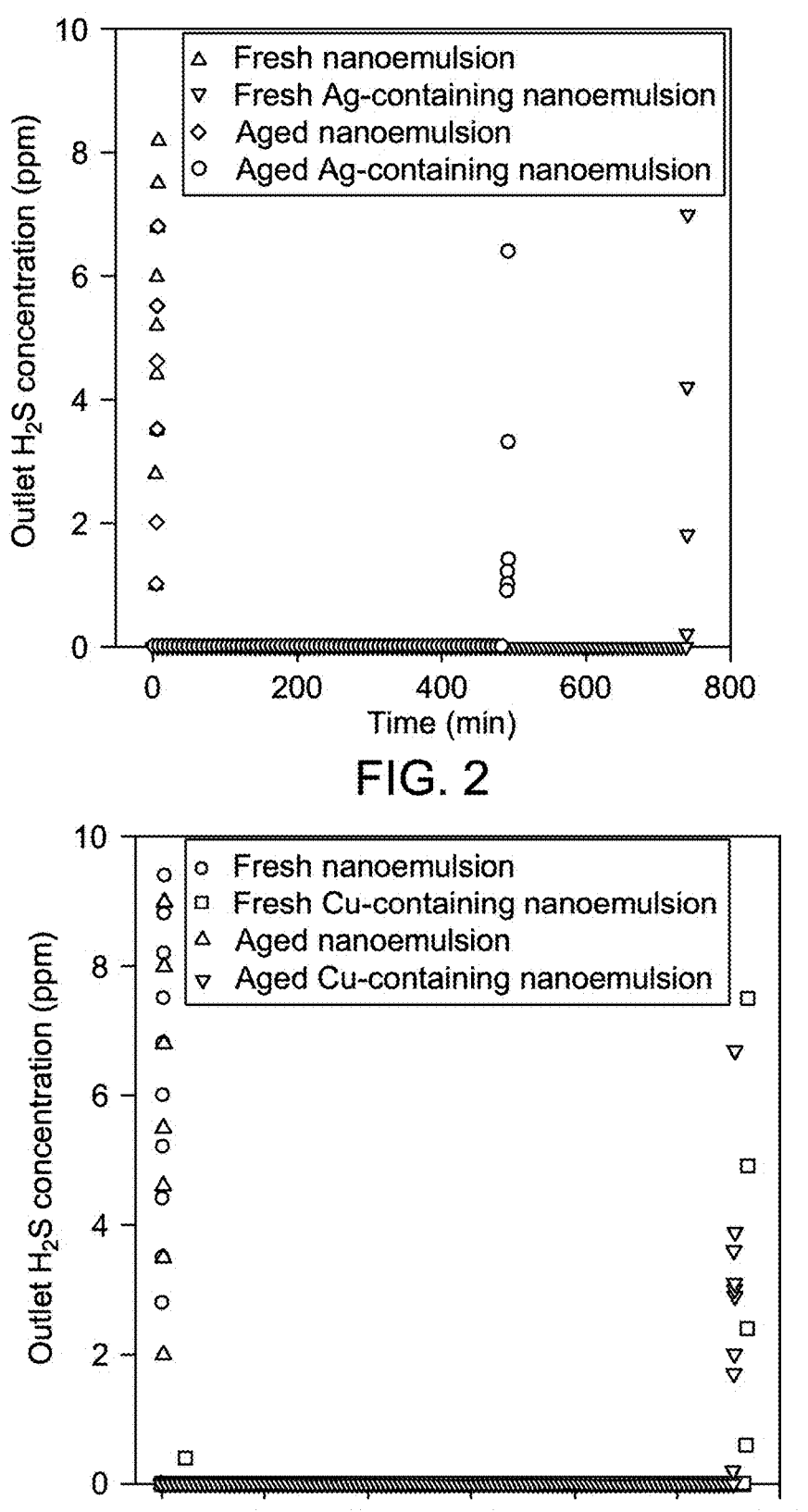
FIG. 2 is a graph depicting $H_2S$ scavenging up to the breakthrough time using fresh and aged nanoemulsion (containing nonionic polyoxyethylene detergent) and fresh and aged silver-containing nanoemulsion (containing silver nitrate and nonionic polyoxyethylene detergent), according to certain embodiments.
FIG. 3 is a graph depicting $H_2S$ scavenging up to the breakthrough time using fresh and aged nanoemulsion (containing nonionic polyoxyethylene detergent) and fresh and aged copper-containing nanoemulsion (containing copper nitrate and nonionic polyoxyethylene detergent), according to certain embodiments.

Example 5: $H_2S$ Scavenging Using Fresh Nanoemulsion 20 mL of the freshly prepared nanoemulsion was placed in a bubble column. The inlet valve of the sour gas (containing 100 parts per million (ppm) $H_2S$ in methane) was opened to allow the gas to flow into the bottom of the bubble column. The gas flow rate was regulated at 100 mL/min using a mass flow controller placed at the bottom of the column. Bubbles of the sour gas rise throughout the nanoemulsion and contact the nanoemulsion ingredients. The gas exiting the bubble column is sent to an $H_2S$ gas detector with a detection limit of 0.5 ppm. The exit gas is monitored and the concentration of $H_2S$ in the treated gas is continuously recorded until attainment of the breakthrough time (defined as the time at which the $H_2S$ concentration in the gas effluent is 5 ppm) (FIG. 2).

Example 6: $H_2S$ Scavenging Using Aged Nanoemulsion 20 mL of aged nanoemulsion (after 30 days of preparation) was placed in a bubble column. The inlet valve of the sour gas (containing 100 parts per million (ppm) $H_2S$ in methane) was opened to allow the gas to flow into the bottom of the bubble column. The gas flow rate was regulated at 100 mL/min using a mass flow controller placed at the bottom of the column. Bubbles of the sour gas rise throughout the aged nanoemulsion and contact the aged nanoemulsion ingredients. The gas exiting the bubble column is sent to an $H_2S$ gas detector with a detection limit of 0.5 ppm. The exit gas is monitored and the concentration of $H_2S$ in the treated gas is continuously recorded until attainment of the breakthrough time (defined as the time at which the $H_2S$ concentration in the gas effluent is 5 ppm) (FIG. 2).

Example 7: $H_2S$ Scavenging Using Fresh Additive-Containing Nanoemulsion 20 mL of freshly prepared additive-containing nanoemulsion was placed in a bubble column. The inlet valve of the sour gas (containing 100 parts per million (ppm) $H_2S$ in methane) was opened to allow the gas to flow into the bottom of the bubble column. The gas flow rate was regulated at 100 mL/min using a mass flow controller placed at the bottom of the column. Bubbles of the sour gas rise throughout the freshly prepared additive-containing nanoemulsion and contact the freshly prepared additive-containing nanoemulsion ingredients. The gas exiting the bubble column is sent to an $H_2S$ gas detector with a detection limit of 0.5 ppm. The exit gas is monitored and the concentration of $H_2S$ in the treated gas is continuously recorded until attainment of the breakthrough time (defined as the time at which the $H_2S$ concentration in the gas effluent is 5 ppm) (FIG. 2).

Example 8: $H_2S$ Scavenging Using Aged Additive-Containing Nanoemulsion 20 mL of the aged additive-containing nanoemulsion (after 30 days of preparation) was placed in a bubble column. The inlet valve of the sour gas (containing 100 parts per million (ppm) $H_2S$ in methane) was opened to allow the gas to flow into the bottom of the bubble column. The gas flow rate was regulated at 100 mL/min using a mass flow controller placed at the bottom of the column. Bubbles of the sour gas rise throughout the freshly prepared additive-containing nanoemulsion and contact the freshly prepared additive-containing nanoemulsion ingredients. The gas exiting the bubble column is sent to an $H_2S$ gas detector with a detection limit of 0.5 ppm. The exit gas is monitored and the concentration of $H_2S$ in the treated gas is continuously recorded until attainment of the breakthrough time (defined as the time at which the $H_2S$ concentration in the gas effluent is 5 ppm) (FIG. 2).

The present disclosure relates to the formulation of mineral oil-in-water nanoemulsions with $H_2S$ scavenging capability. The nanoemulsion includes 20 percent by volume (vol. %) mineral oil and 80 vol. % water, stabilized with 2 wt. % nonionic polyoxyethylene detergent. The nanoemulsions exhibit excellent stability, with no phase separation observed after 30 days of storage. Addition of silver nitrate enhances the nanoemulsion's performance without affecting its stability. Upon contact with sour gas containing $H_2S$, the silver-containing nanoemulsion has a $H_2S$ breakthrough time of 741 minutes (=11.34 hours), corresponding to 171.7 milligrams per gram (mg/g) $H_2S$ scavenging capacity (corresponding to 515.0 mg $H_2S/L$ nanoemulsion), for the fresh nanoemulsion and 493 minutes (=8.22 hours), corresponding to 114.3 mg/g $H_2S$ scavenging capacity (corresponding to 342.9 mg $H_2S/L$ nanoemulsion), for the aged nanoemulsion, indicating a minimal effect of aging on scavenging performance. The formulation is adaptable, allowing for substitution of the oil phase, emulsifier, or $H_2S$ scavenger (i.e., additive), with adjustable concentrations to achieve performance.

Examples 1-8 also apply to the formulation of other nanoemulsions where the salt and surfactant are altered, while the remaining components stay the same. Examples 1-8 also apply for the formulation of a copper-containing nanoemulsion including copper nitrate trihydrate and nonionic polyoxyethylene detergent, a silver-containing nanoemulsion including silver nitrate trihydrate and a sodium dodecylbenzenesulfonate, a copper-containing nanoemulsion including copper nitrate and sodium dodecylbenzenesulfonate, and a copper-containing nanoemulsion including cetyltrimethylammonium bromide and copper nitrate trihydrate.

The present disclosure relates to the formulation of mineral oil-in-water nanoemulsions with $H_2S$ scavenging capability, including 20 vol. % mineral oil, 2 wt. % nonionic polyoxyethylene surfactant, and the remainder water, demonstrating excellent stability with no phase separation after 30 days of storage. Copper nitrate is added to enhance stability, as shown by the absence of phase separation in aged copper-containing nanoemulsions. The copper-containing nanoemulsions exhibit $H_2S$ scavenging capability, with a breakthrough time of 1135 minutes (=18.91 hours), corresponding to 338.9 mg/g $H_2S$ scavenging capability for the fresh copper-containing nanoemulsion (corresponding to 1016.7 mg $H_2S/L$ nanoemulsion) and 1110 minutes (=18.5 hours) corresponding to 331.1 mg/g $H_2S$ scavenging capability for the aged copper-containing nanoemulsion (corresponding to 993.3 mg $H_2S/L$ nanoemulsion), indicating minimal impact of aging. The formulation is adaptable, allowing substitution of the oil phase, emulsifier, $H_2S$ scavenger, and adjustment of their contents to achieve performance. The $H_2S$ scavenging apparatus/structure can also be varied.

Example 9: Zeta Potential of the Nanoemulsion

Another emulsion characteristic is the charge density at the surface of the emulsion droplets, which can be inferred from zeta potential measurements. The zeta potential values of nanoemulsions were determined immediately after nanoemulsion preparation and after aging 30 days.

Figure 4:
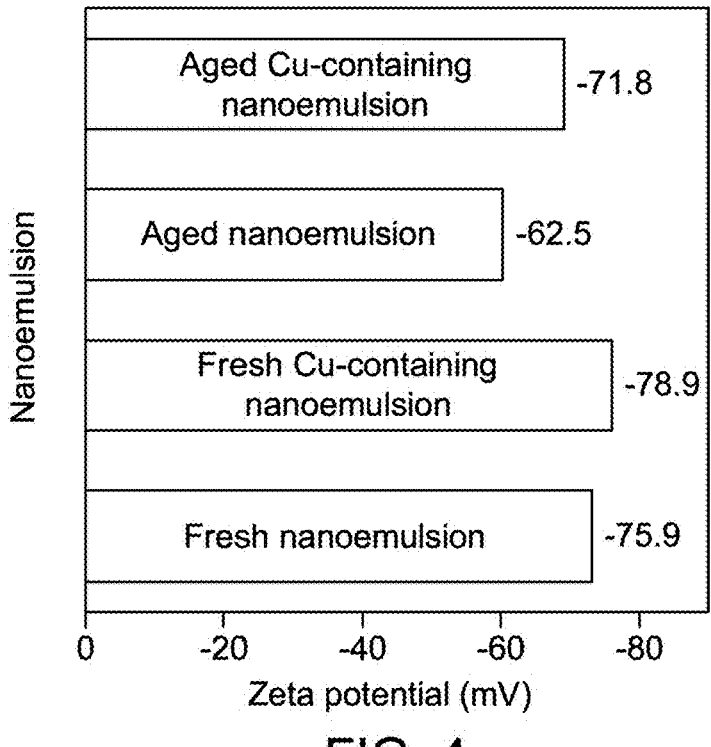
FIG. 4 is a bar graph depicting zeta potential of a fresh nanoemulsion (containing sodium dodecylbenzenesulfonate), a fresh silver-containing nanoemulsion (containing silver nitrate trihydrate and sodium dodecylbenzenesulfonate), an aged nanoemulsion (containing sodium dodecylbenzenesulfonate) (after 30 days), and an aged silver-containing nanoemulsion (containing silver nitrate trihydrate and sodium dodecylbenzenesulfonate) (after 30 days) nanoemulsion, according to certain embodiments.

Zeta potential (FIG. 4) of the fresh nanoemulsion (including silver nitrate trihydrate and sodium dodecylbenzenesulfonate) is −75.9 millivolts (mV). Any emulsion with a zeta potential>+30 mV or <−30 mV is classified as stable emulsion. Accordingly, the nanoemulsion is to be stable. The aged nanoemulsion after 30 days of storage showed no visible oil or water separation from the nanoemulsion. The zeta potential after 30 days of storage is −62.5 mV, implying and supporting the stability of the nanoemulsions.

In the presence of 0.3 wt. % silver nitrate, the zeta potential increased to −78.9 mV, suggesting that the addition of silver slightly improves the nanoemulsion stability. In line with this observation, the zeta potential of the aged silver-containing nanoemulsion after 30 days of storage is-71.8 mV, which is ~15% higher than the case of silver-free nanoemulsion, confirming better stability of the silver-containing nanoemulsions. The aged silver-containing nanoemulsion after 30 days of storage do not show any phase separation from the silver-containing nanoemulsion, demonstrating that the addition of silver nitrate has a positive impact on the nanoemulsion stability.

Figure 5:
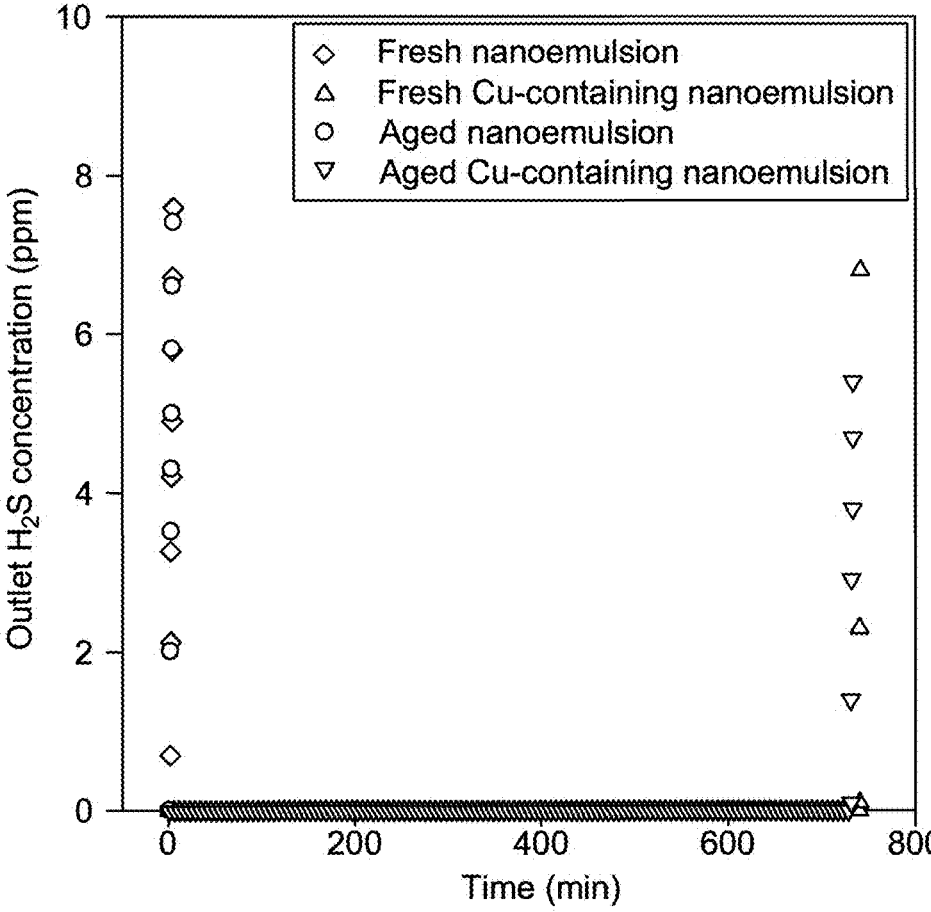
FIG. 5 is a graph depicting $H_2S$ scavenging up to the breakthrough time using fresh and aged nanoemulsion (containing sodium dodecylbenzenesulfonate) and aged silver-containing nanoemulsion (containing silver nitrate trihydrate and sodium dodecylbenzenesulfonate), according to certain embodiments.

The present disclosure relates to mineral oil-in-water nanoemulsions with $H_2S$ scavenging capability, including 20 vol. % mineral oil, 2 wt. % sodium dodecylbenzenesulfonate (SDBS) surfactant, and the remainder water. The nanoemulsion demonstrates excellent stability, with no phase separation after 30 days and a zeta potential of −75.9 mV for the fresh nanoemulsion. The addition of 0.3 wt. % silver nitrate decreases the zeta potential to −78.9 mV, enhancing stability, with the aged silver-containing nanoemulsion maintaining a zeta potential of −71.8 mV. The silver-containing nanoemulsions exhibit $H_2S$ scavenging capacity, with breakthrough times (FIG. 5) of 742 minutes (=12.36 hours), corresponding to 171.9 mg/g $H_2S$ scavenging capability for the fresh silver-containing nanoemulsion (corresponding to 515.7 mg $H_2S$/L nanoemulsion) and 733 minutes (=12.21 hours), corresponding to 169.9 mg/g) for the aged silver-containing nanoemulsion (corresponding to 509.7 mg $H_2S$/L nanoemulsion), showing minimal impact of aging. The formulation of the nanoemulsion allows substitution of the oil phase, emulsifier, $H_2S$ scavenger, and adjustment of concentrations as needed. The $H_2S$ scavenging apparatus may also be modified.

Figure 6:
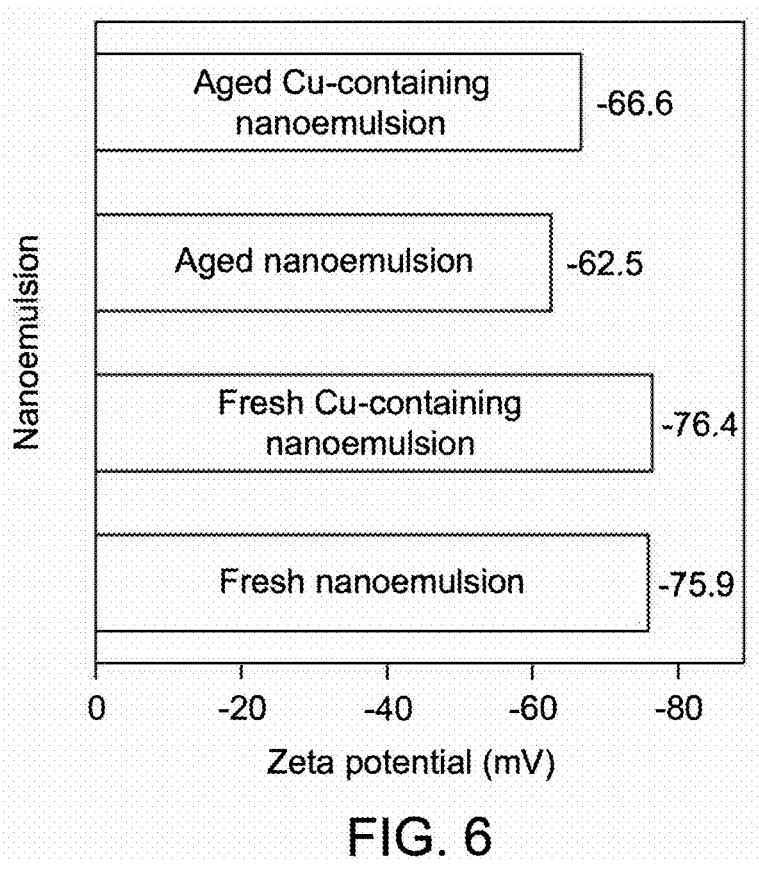
FIG. 6 is a bar graph depicting zeta potential of a fresh nanoemulsion (containing sodium dodecylbenzenesulfonate), a fresh copper-containing nanoemulsion (containing copper nitrate trihydrate and sodium dodecylbenzenesulfonate), an aged nanoemulsion (containing sodium dodecylbenzenesulfonate) (after 30 days), and an aged copper-containing nanoemulsion (containing copper nitrate trihydrate and sodium dodecylbenzenesulfonate) (after 30 days) nanoemulsion, according to certain embodiments.

In the presence of 0.3 wt. % copper nitrate trihydrate ($Cu(NO_3)_2 \cdot 3H_2O$), the zeta potential (FIG. 6) decreased to −76.4 mV, suggesting that the addition of copper improves nanoemulsion stability. In line with this observation, the zeta potential of the aged copper-containing nanoemulsion after 30 days of storage is −66.6 mV, which is ~7% higher than the case of copper-free nanoemulsion, supporting the better stability of the copper-containing nanoemulsions. The aged copper-containing nanoemulsion after 30 days of storage do not show any phase separation, demonstrating that the addition of copper nitrate has a positive impact on the nanoemulsion stability.

Figure 7:
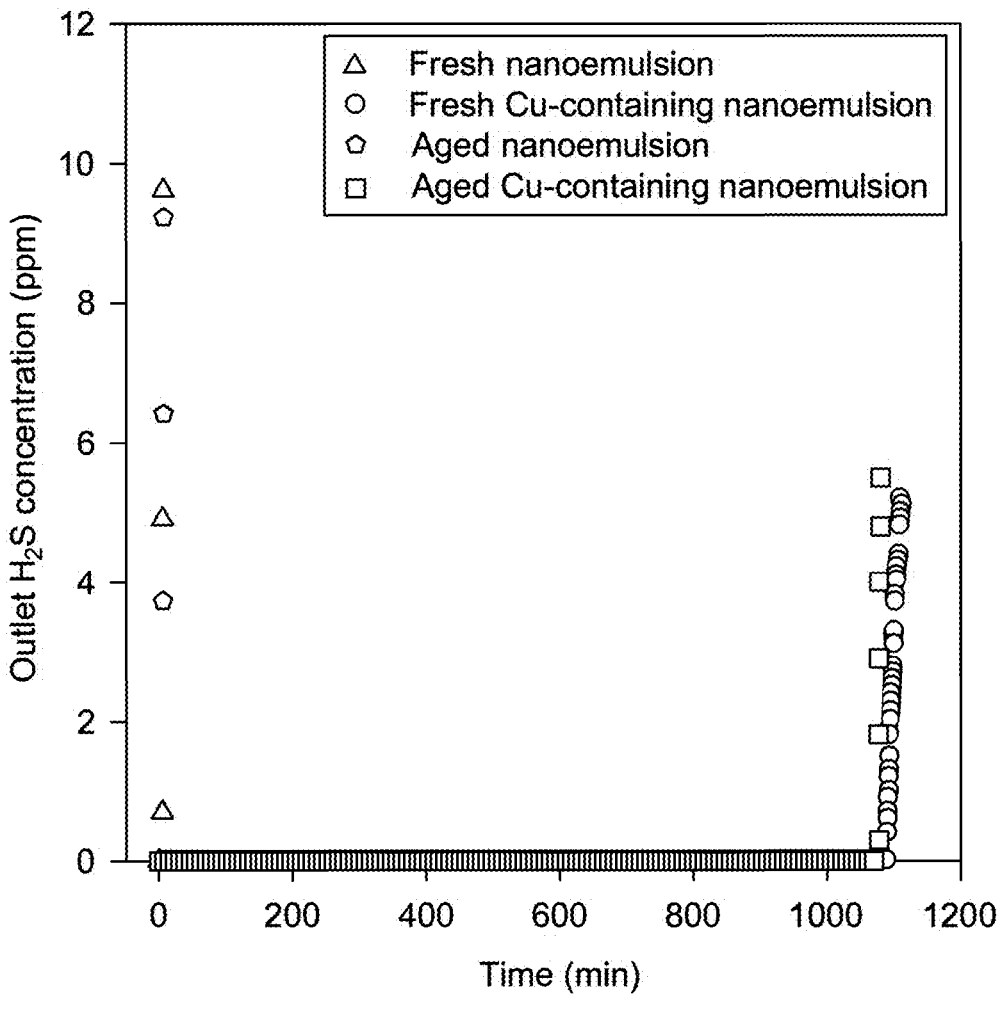
FIG. 7 is a graph depicting $H_2S$ scavenging up to the breakthrough time using fresh and aged nanoemulsion (containing sodium dodecylbenzenesulfonate) and fresh and aged copper-containing nanoemulsion (including copper nitrate trihydrate and sodium dodecylbenzenesulfonate), according to certain embodiments.

To determine the $H_2S$ scavenging capability of the nanoemulsions, they were contacted with a sour gas containing $H_2S$. The fresh and aged copper-free nanoemulsions did not $H_2S$ scavenging capability. Contrarily, the copper-containing nanoemulsions showed good $H_2S$ scavenging capability. The breakthrough time (FIG. 7) of the fresh copper-containing nanoemulsion is 1090 min (=18.17 hours), corresponding to 325.6 mg/g $H_2S$ scavenging capacity (corresponding to 976.8 mg $H_2S$/L nanoemulsion). Aging the copper-containing nanoemulsion did not alter its $H_2S$ scavenging capability. The breakthrough time of the aged copper-containing nanoemulsion is 1080 min (=18 hours), corresponding to 322.6 mg/g $H_2S$ scavenging capacity (corresponding to 967.8 mg $H_2S$/L nanoemulsion). The breakthrough time of the aged copper-containing nanoemulsion is 99.1% of those obtained using the fresh copper-containing nanoemulsion, confirming that aging the copper-containing nanoemulsion did not impact its $H_2S$ scavenging performance.

The present disclosure relates to mineral oil-in-water nanoemulsions with $H_2S$ scavenging capability, including 20 vol. % mineral oil, 2 wt. % SDBS surfactant, and the remainder water. The nanoemulsions exhibit good stability with no phase separation after 30 days, and a zeta potential of −75.9 mV for the fresh formulation. Addition of 0.3 wt. % copper nitrate trihydrate decreases the zeta potential to −76.4 mV, improving stability, with the aged copper-containing nanoemulsion maintaining a zeta potential of −66.6 mV. The copper-containing nanoemulsions show strong $H_2S$ scavenging capacity, with breakthrough times of 1090 minutes ((=18.17 hours), corresponding to 325.6 mg/g $H_2S$ scavenging capacity for the fresh copper-containing nanoemulsion (corresponding to 976.8 mg $H_2S$/L nanoemulsion) and 1080 minutes (=18 hours), corresponding to 322.6 mg/g $H_2S$ scavenging capacity for the aged copper-containing nanoemulsion (corresponding to 967.8 mg $H_2S$/L nanoemulsion), indicating minimal impact of aging. The formulation is adaptable, allowing substitution of oil phase, emulsifier, or $H_2S$ scavenger, with adjustable concentrations for desired performance. The $H_2S$ scavenging apparatus can also be modified.

Figure 8:
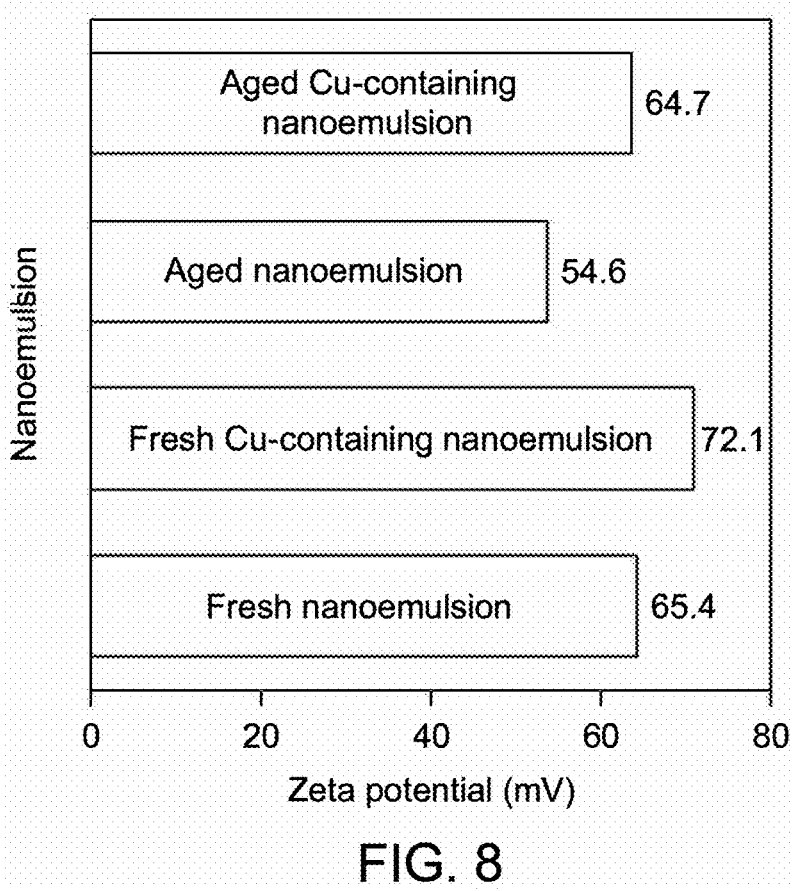
FIG. 8 is a bar graph depicting zeta potential of a fresh nanoemulsion (containing cetyltrimethylammonium bromide), a fresh copper-containing nanoemulsion (containing copper nitrate trihydrate trihydrate and cetyltrimethylammonium bromide), an aged nanoemulsion (containing cetyltrimethylammonium bromide) (after 30 days), and an aged copper-containing nanoemulsion (containing copper nitrate trihydrate trihydrate and cetyltrimethylammonium bromide) (after 30 days) nanoemulsion, according to certain embodiments.
Figure 9:
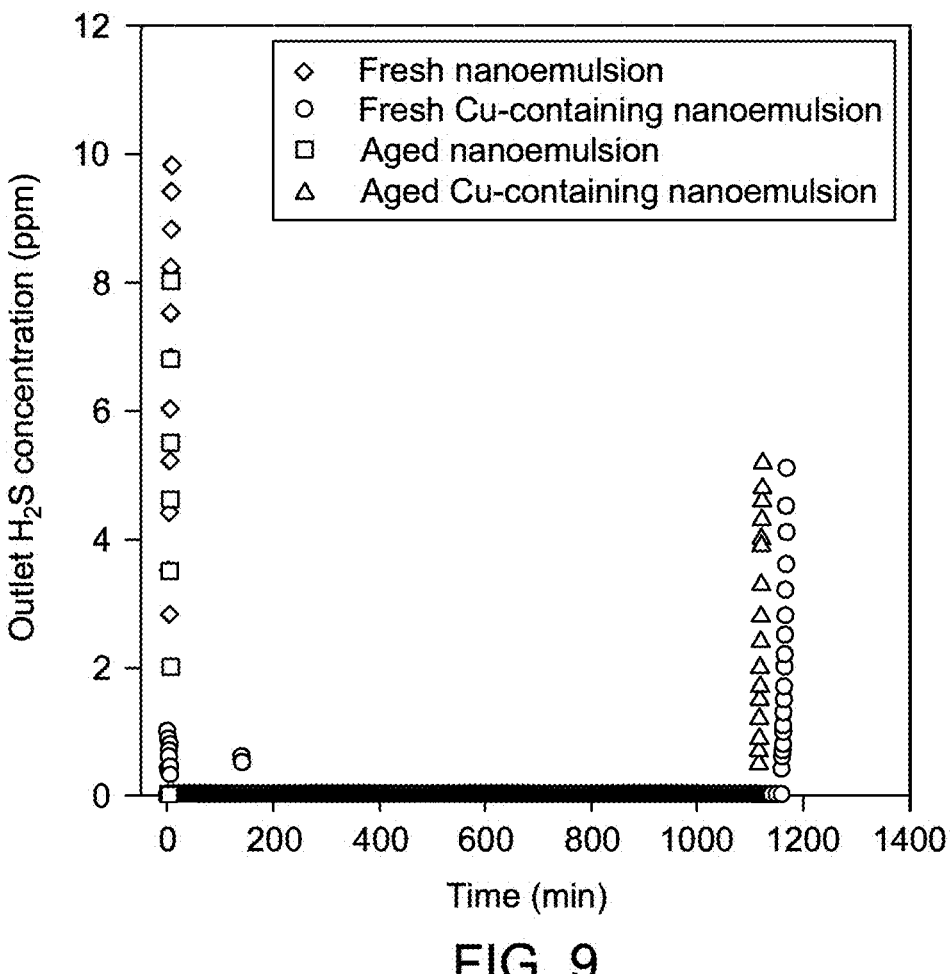
FIG. 9 is a graph depicting $H_2S$ scavenging up to the breakthrough time using fresh and aged nanoemulsion (containing cetyltrimethylammonium bromide) and fresh and aged copper-containing nanoemulsion (containing copper nitrate trihydrate and cetyltrimethylammonium bromide), according to certain embodiments.

The present disclosure relates to the formulation of mineral oil-in-water nanoemulsions with $H_2S$ scavenging capability, including 20 vol. % mineral oil, 2 wt. % cetyltrimethylammonium bromide (CTAB) surfactant, and the remainder water. The nanoemulsion demonstrates stability, with no phase separation after 30 days and a zeta potential of 65.4 mV (FIG. 8), confirming stability. The addition of 0.3 wt. % copper nitrate trihydrate increases the zeta potential to 72.1 mV, enhancing nanoemulsion stability, with the aged copper-containing nanoemulsion maintaining a zeta potential of 64.7 mV. The copper-containing nanoemulsions show $H_2S$ scavenging capacity, with breakthrough times of 1161 minutes (=19.35 hours), correspond to 346.7 mg/g $H_2S$ scavenging capacity for the fresh copper-containing nanoemulsion (corresponding to 1040.1 mg $H_2S$/L nanoemulsion) and 1115 minutes (=18.53 hours), corresponding to 333.1 mg/g $H_2S$ scavenging capacity for the aged copper-containing nanoemulsion (corresponding to 999.3 mg $H_2S$/L nanoemulsion), indicating minimal impact of aging (FIG. 9). The formulation allows for substitution of oil phase, emulsifier, $H_2S$ scavenger, and adjustment of concentrations as needed. The $H_2S$ scavenging apparatus can also be varied.

In the present disclosure, a method is provided for formulating highly stable oil-in-water nanoemulsions with enhanced $H_2S$ scavenging capability. The method involves the use of a suitable oil phase, aqueous phase, surfactant, and the silver or copper scavenger (i.e., additive), which result in the formation of stable nanoemulsions. Variations in the formulation may include the replacement of mineral oil with alternative oils, substitution of water with different aqueous solutions, and/or the use of different surfactants or scavengers. The method allows flexibility in altering the nanoemulsion composition to produce water-in-oil nanoemulsions to enhance their characteristics for improved $H_2S$ scavenging performance. Additionally, the nanoemulsions can be processed using different mixing techniques, such as a continuously stirred tank, and can be applied to treat sour gases, including natural gas, biogas, or refinery gas.

Numerous modifications and variations of the present disclosure are possible in light of the above teachings. It is, therefore, to be understood that within the scope of the appended claims, the disclosure may be practiced otherwise than as specifically described herein.

The invention claimed is:

1. A method of scavenging hydrogen sulfide from a sour gas well, comprising:

injecting a nanoemulsion through a borehole into a subterranean geological formation comprising a gaseous hydrocarbon composition comprising hydrogen sulfide, wherein the nanoemulsion comprises a mineral oil, water, a surfactant, and an additive, wherein the water is a continuous phase of the nanoemulsion, wherein the surfactant is selected from a group consisting of a sodium dodecylbenzenesulfonate, a cetyltrimethylammonium bromide, and a nonionic polyoxyethylene detergent, wherein the additive is selected from a group consisting of a silver salt and a copper salt when the surfactant is the sodium dodecylbenzenesulfonate or the nonionic polyoxyethylene detergent, and wherein the additive is the copper salt when the surfactant is the cetyltrimethylammonium bromide, circulating the nanoemulsion in the borehole in the sub-
terranean geological formation to contact the nanoe-
mulsion with the hydrocarbon composition; and reacting the nanoemulsion with the hydrogen sulfide in
the gaseous hydrocarbon composition to form a pro-
duction gas comprising less than 5 ppm of hydrogen
sulfide, wherein the nanoemulsion is circulated in the borehole
while the borehole is sealed under static pressure, and wherein a mineral oil phase of the nanoemulsion has an
average particle size of 20 to 200 nm.

2. The method of claim 1, wherein a volumetric ratio of
the mineral oil to the water in the nanoemulsion is from 1:3
to 1:5, and the nanoemulsion consists of the mineral oil,
water, the surfactant, and the additive; and wherein the additive is present in the nanoemulsion in an
amount of 0.1 to 1 percent by weight (wt. %) based on
a total weight of the nanoemulsion and selected from
the group consisting of the silver salt and the copper
salt.

3. The method of claim 1, wherein the nanoemulsion
comprises the surfactant in an amount of 0.5 to 5 percent wt.
% based on a total weight of the nanoemulsion.

4. The method of claim 1, wherein the subterranean
geological formation further comprises a liquid hydrocarbon
composition.

5. The method of claim 1, wherein the surfactant is the
nonionic polyoxyethylene detergent, the additive is the
silver salt, and a breakthrough time of the hydrogen sulfide
is 720 to 760 minutes.

6. The method of claim 1, wherein the surfactant is the
cetyltrimethylammonium bromide, the additive is the copper
salt, and a breakthrough time of the hydrogen sulfide is 1140
to 1180 minutes.

7. The method of claim 1, wherein the surfactant is the
nonionic polyoxyethylene detergent, the additive is the
copper salt, and the breakthrough time of the hydrogen
sulfide is 1110 to 1160 minutes.

8. The method of claim 1, wherein the surfactant is the
sodium dodecylbenzenesulfonate, the additive is the copper
salt, and the breakthrough time of the hydrogen sulfide is
1070 to 1110 minutes.

9. The method of claim 1, wherein the surfactant is the
cetyltrimethylammonium bromide, the additive is the copper
salt, and a zeta potential of the nanoemulsion is 67 to 77 mV.

10. The method of claim 1, wherein the surfactant is the
sodium dodecylbenzenesulfonate, the additive is the copper
salt, and a zeta potential of the nanoemulsion is −80 to −70
mV.

11. The method of claim 1, further comprising:

aging the nanoemulsion for 25 to 35 days before the
injecting.

12. The method of claim 11, wherein the surfactant is the
nonionic polyoxyethylene detergent, the additive is the
silver salt, and a breakthrough time of the hydrogen sulfide
is 480 to 510 minutes.

13. The method of claim 11, wherein the surfactant is the
cetyltrimethylammonium bromide, the additive is the copper
salt, and a breakthrough time of the hydrogen sulfide is 1100
to 1130 minutes.

14. The method of claim 11, wherein the surfactant is the
cetyltrimethylammonium bromide, the additive is the copper
salt, and a zeta potential of the nanoemulsion is 60 to 70 mV.

15. The method of claim 11, wherein the surfactant is the
nonionic polyoxyethylene detergent, the additive is the
copper salt, and the breakthrough time of the hydrogen
sulfide is 1090 to 1130 minutes.

16. The method of claim 11, wherein the surfactant is the
sodium dodecylbenzenesulfonate, the additive is the copper
salt, and the breakthrough time of the hydrogen sulfide is
1060 to 1100 minutes.

17. A method of scavenging hydrogen sulfide from a sour
gas well, comprising:

injecting a nanoemulsion through a borehole into a sub-
terranean geological formation comprising a gaseous
hydrocarbon composition comprising hydrogen sulfide, wherein the nanoemulsion comprises a mineral oil, water,
a surfactant, and an additive, wherein the water is a continuous phase of the nanoemul-
sion, wherein the surfactant is a sodium dodecylbenzene-
sulfonate and the additive is a silver salt, circulating the nanoemulsion in the borehole in the sub-
terranean geological formation to contact the nanoe-
mulsion with the hydrocarbon composition; and reacting the nanoemulsion with the hydrogen sulfide in
the gaseous hydrocarbon composition to form a pro-
duction gas comprising less than 5 ppm of hydrogen
sulfide, wherein a breakthrough time of the hydrogen sulfide is
720 to 760 minutes.

18. The method of claim 17, wherein a zeta potential of
the nanoemulsion is −84 to −74 mV.

19. The method of claim 17, further comprising:

aging the nanoemulsion for 25 to 35 days before the
injecting, wherein a breakthrough time of the hydrogen sulfide is
710 to 750 minutes, and wherein a zeta potential of the nanoemulsion is −75 to −67
mV.

20. A method of scavenging hydrogen sulfide from a sour
gas well, comprising:

injecting a nanoemulsion through a borehole into a sub-
terranean geological formation comprising a gaseous
hydrocarbon composition comprising hydrogen sulfide, wherein the nanoemulsion comprises a mineral oil, water,
a surfactant, and an additive, wherein the water is a continuous phase of the nanoemul-
sion, wherein the surfactant is selected from a group consisting
of a sodium dodecylbenzenesulfonate and a nonionic
polyoxyethylene detergent, wherein the additive is a silver salt, circulating the nanoemulsion in the borehole in the sub-
terranean geological formation to contact the nanoe-
mulsion with the hydrocarbon composition; and reacting the nanoemulsion with the hydrogen sulfide in
the gaseous hydrocarbon composition to form a pro-
duction gas comprising less than 5 ppm of hydrogen
sulfide.

* * * * *